(12) United States Patent
Hoque et al.

(10) Patent No.: US 10,768,196 B2
(45) Date of Patent: Sep. 8, 2020

(54) DETERMINE WEARING POSITION OF A WEARABLE DEVICE

(71) Applicant: Huami Inc., Mountain View, CA (US)

(72) Inventors: Enamul Hoque, Mountain View, CA (US); Jun Yang, Mountain View, CA (US); Joseph Munaretto, Mountain View, CA (US)

(73) Assignee: Huami Inc., Cupertino, CA (US)

( * ) Notice: Subject to any disclaimer, the term of this patent is extended or adjusted under 35 U.S.C. 154(b) by 618 days.

(21) Appl. No.: 15/383,507

(22) Filed: Dec. 19, 2016

(65) Prior Publication Data

US 2018/0172441 A1    Jun. 21, 2018

(51) Int. Cl.

| G01B 21/00 | (2006.01) |
| G01P 13/00 | (2006.01) |
| G04G 21/00 | (2010.01) |
| H04B 1/00 | (2006.01) |
| H04B 1/3827 | (2015.01) |
| G06F 1/00 | (2006.01) |
| G06F 1/16 | (2006.01) |

(52) U.S. Cl.
CPC .............. *G01P 13/00* (2013.01); *G04G 21/00* (2013.01); *G06F 1/00* (2013.01); *H04B 1/00* (2013.01); *H04B 1/385* (2013.01); *G06F 1/163* (2013.01)

(58) Field of Classification Search
None
See application file for complete search history.

(56) References Cited

U.S. PATENT DOCUMENTS

| 6,323,846 B1* | 11/2001 | Westerman ............. G06F 3/044 345/173 |
| 8,538,722 B2* | 9/2013 | Naya .................. G06K 9/00335 600/595 |
| 9,766,074 B2* | 9/2017 | Roumeliotis .......... G01C 21/16 |
| 10,314,538 B2* | 6/2019 | Munaretto ........... A61B 5/6823 |
| 2011/0304497 A1* | 12/2011 | Molyneux ............ A43B 1/0054 342/42 |

(Continued)

FOREIGN PATENT DOCUMENTS

| EP | 3003516 A2 | 4/2016 |
| WO | 201419952 A1 | 2/2014 |

(Continued)

*Primary Examiner* — Tung S Lau
(74) *Attorney, Agent, or Firm* — Young Basile Hanlon & MacFarlane, P.C.

(57) ABSTRACT

Method, apparatus and system for determining a wearing position of a wearable device. The method includes receiving motion data from a wearable device associated with an individual, wherein the motion data comprises a first data segment and a second data segment, the first data segment associated with walking, and the second data segment associated with non-walking. The method further includes determining first characteristic data associated with the first data segment and second characteristic data associated with the second data segment. The method further includes determining, by a computing device, a wearing position of the wearable device associated with the individual based on the first characteristic data and a match between the second characteristic data and an activity signature associated with a time of day.

20 Claims, 7 Drawing Sheets

(56) References Cited

U.S. PATENT DOCUMENTS

| | | | |
|---|---|---|---|
| 2013/0130843 A1* | 5/2013 | Burroughs | A63B 71/0686 473/415 |
| 2014/0039842 A1* | 2/2014 | Yuen | A61B 5/6838 702/189 |
| 2014/0278139 A1 | 9/2014 | Hong et al. | |
| 2014/0278220 A1* | 9/2014 | Yuen | G01B 21/16 702/150 |
| 2014/0292564 A1* | 10/2014 | Park | G01S 19/14 342/357.2 |
| 2015/0036034 A1 | 2/2015 | Yatabe et al. | |
| 2015/0146933 A1 | 5/2015 | Shibuya et al. | |
| 2015/0153457 A1* | 6/2015 | Park | H04W 4/029 342/357.57 |
| 2015/0262467 A1* | 9/2015 | Yuen | A61B 5/1118 340/870.07 |
| 2015/0363035 A1 | 12/2015 | Hinckley et al. | |
| 2016/0131677 A1* | 5/2016 | Bostick | G06K 9/00335 73/865.4 |
| 2016/0179338 A1 | 6/2016 | Miller | |
| 2017/0173262 A1* | 6/2017 | Veltz | G16H 20/17 |
| 2018/0055417 A1* | 3/2018 | Munaretto | A61B 5/6823 |

FOREIGN PATENT DOCUMENTS

| | | | |
|---|---|---|---|
| WO | 2016028228 A1 | 2/2016 | |
| WO | 2016094375 A1 | 6/2016 | |

* cited by examiner

DETERMINE WEARING POSITION OF A WEARABLE DEVICE

TECHNICAL FIELD

This disclosure relates in general to methods, apparatuses and systems of automatically determining wearing positions of wearable devices.

BACKGROUND

Wearable devices, such as smart watches and fitness bands, have become common nowadays for monitoring health status and tracking fitness of individuals. The wearable devices can be used for a variety of applications, such as step counting, activity tracking or calorie-burn estimation. Activity tracking can include, for example, sleep or exercise tracking. For some applications, accuracy of the results can depend on knowing the wearing position of a device on the body, such as whether the device is on the left or right hand. The accuracy of the results can also depend on knowing, for example, the hand-dominance of an individual wearing the device. However, the individual may not always wear the same device on the same body side, or may forget to provide information about the wearing position or hand-dominance to the device.

SUMMARY

Disclosed herein are aspects of implementations of methods, apparatuses, and systems for determining wearing positions of a wearable device, such as hand-dominance of an individual wearer.

In an aspect, a method for determining a wearing position of a wearable device is disclosed. The method includes receiving motion data from a wearable device associated with an individual, wherein the motion data comprises a first data segment and a second data segment, the first data segment associated with walking, and the second data segment associated with non-walking. The method further includes determining first characteristic data associated with the first data segment and second characteristic data associated with the second data segment. The method further includes determining, by a computing device, a wearing position of the wearable device associated with the individual based on the first characteristic data and a match between the second characteristic data and an activity signature associated with a time of day.

In another aspect, a wearable device is disclosed. The wearable device includes a body configured to be coupled to a portion of an individual, a motion sensor coupled to the body, a non-transitory memory, and a processor configured to execute instructions stored in the non-transitory memory to: receive motion data from the motion sensor, wherein the motion data comprises a first data segment and a second data segment, the first data segment associated with walking, and the second data segment associated with non-walking; determine first characteristic data associated with the first data segment and second characteristic data associated with the second data segment; and determine a wearing position of the wearable device associated with the individual based on the first characteristic data and a match between the second characteristic data and an activity signature associated with a time of day.

In another aspect, a system is disclosed. The system includes a measurement component and an analysis component. The measurement component includes a body configured to be coupled to a portion of an individual, and a motion sensor coupled to the body. The analysis component includes a non-transitory memory, and a processor configured to execute instructions stored in the non-transitory memory to: receive motion data from the motion sensor, wherein the motion data comprises a first data segment associated with a first activity mode and a second data segment associated with a second activity mode; determine first characteristic data associated with the first data segment and second characteristic data associated with the second data segment; and determine a wearing position of the measurement component associated with the individual based on the first characteristic data and a match between the second characteristic data and an activity signature associated with a time of day.

Details of these implementations, modifications of these implementations and additional implementations are described below.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
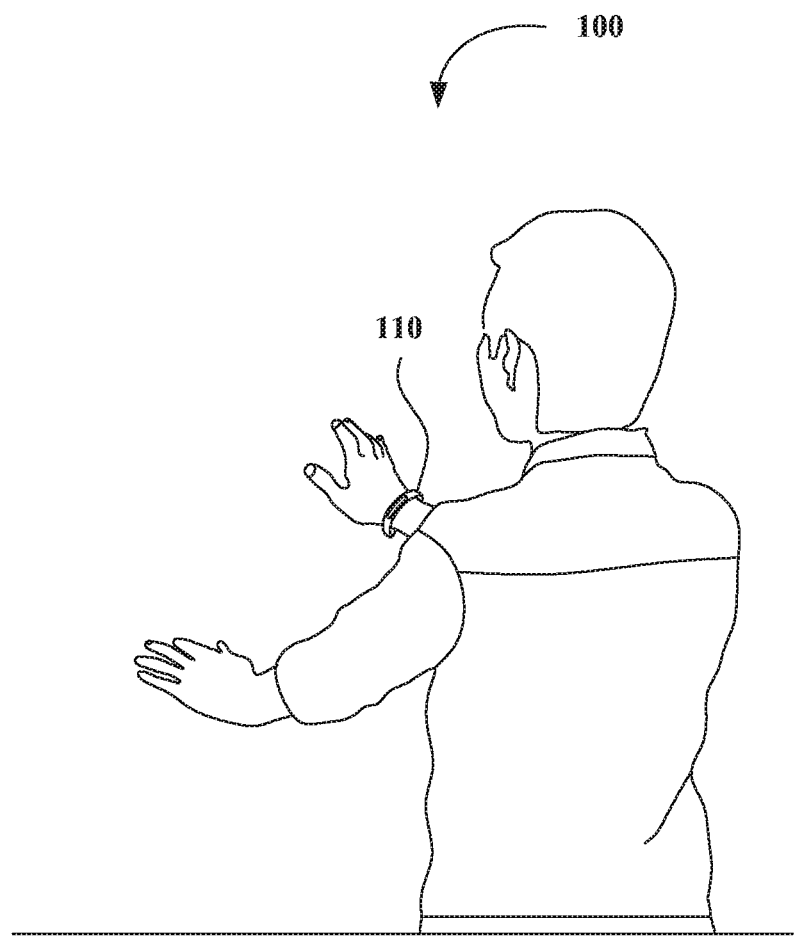
FIG. 1 is an illustration showing an example wearable system in use.

Example implementations of the present disclosure will be described below with reference to the accompanying drawings. The same numbers across the drawings set forth in the following description represent the same or similar elements, unless differently expressed. The implementations set forth in the following description do not represent all implementations or embodiments consistent with the present disclosure; on the contrary, they are only examples of apparatuses and methods in accordance with some aspects of this disclosure as detailed in the claims.

As mobile health care market size keeps growing, devices and systems using wearable technologies to aid fitness or health assessments have become widely used. Wearable devices, such as smart watches and fitness bands, have been used for monitoring health status and tracking fitness of individuals. Wearable devices can be used for a variety of applications, such as step counting, activity tracking or calorie-burn estimation. Activity tracking can include, for example, sleep or exercise tracking. For some applications, accuracy of the results can depend on knowing the positions of the wearable devices on the body, such as on the left or right hand. Accuracy of the results can also depend on, for example, the hand-dominance of an individual wearing the wearable device, such as whether the individual is left-handed or right-handed. However, since the individual may not always wear the same device on the same body side, the accuracy of the results can be affected when the individual switches the wearable device to a different body side without notifying the wearable device. Or, the individual can forget to provide information of the wearing position information to the wearable device. Therefore, solutions for automatically inferring the wearing position, such as which hand the wearable device is on, and/or hand-dominance of the individual, can help the wearable device to obtain more accurate results for activity tracking, or to be able to fine-tune the functionalities of the wearable device.

In implementations of this disclosure, the wearing position can be inferred from motion data collected by a wearable device. Determining the wearing position can include one or more of inferring whether the wearable device is on the left or right hand, or whether the wearable device is on the dominant or non-dominant hand. Determining the wearing position can also include, for example, automatically detecting whether the individual wearing the device is left-handed or right-handed. In some implementations, a wearing position can include one or more of: an indication of whether the wearable device is worn on a left or right side of the individual, an indication of whether the wearable device is worn on a dominant or non-dominant side of the individual, and an indication of whether the individual is left-handed or right-handed.

Motion data, such as accelerometer data, can be used to differentiate between the cases of wearing the wearable device on the left or the right hand. For example, a crowd sourcing approach can be used to generate crowdsourced data by aggregating the motion data across multiple users. For example, data generated from different users can be combined to determine left-handed and right-handed data in the crowd sourcing approach.

To differentiate between dominant and non-dominant hands, activity signatures can be generated based on temporal and/or spatial characteristics of the motion data. The activity signatures can be generated using, for example, unsupervised learning. The activity signatures can be generated based on, for example, crowdsourced data from multiple users. Based on the presence or absence of the activity signatures, it can be identified whether the wearable device is on the dominant or non-dominant hand.

In some implementations, determining the wearing position of the wearable device can be implemented using a two-stage process. For example, the two-stage process can be used to detect whether the individual is left-handed or right-handed. At a first stage, walking data segments are identified from the motion data, and features extracted from the walking data segments are used to detect whether the wearable device is being worn on the left or right hand of the individual. At a second stage, non-walking data segments are identified from the motion data, from which daily activity signatures, usually performed using dominant hands, are identified. Based on the results from the first stage and the second stage, the individual can be labeled as "left-handed" or "right-handed", for example. Other details are described herein after first describing an environment in which the disclosure may be implemented.

FIG. 1 is a diagram of an implementation of a wearable system 100 which can include a wearable apparatus 110 in use. In this example, the wearable apparatus 110 is worn by an individual on the right hand. The wearable apparatus 110 can include a housing that is in the form of a ring, bracelet, wristband, watch, pendant, armband, anklet, headband, belt, necklace, glove, a chest patch, or other mechanism for securing or attaching the wearable apparatus 110 to the individual.

According to an implementation, the wearable apparatus 110 can include one or more processing cores (not shown) that are configured to receive signals from sensors (not shown) that can include one or more motion sensors. The signals received by the wearable apparatus 110 can include motion data, which can include measurement data from the motion sensor indicating a motion status of the individual. The motion sensor can be one or more devices or modules that can measure spatial and/or temporal parameters of the motion (e.g., velocity, speed, or acceleration). For example, the motion sensor can be an accelerometer, a gyroscope, an inertia measurement unit (IMU) sensor, or a magnetometer. For example, the motion sensor can be a 3-axis accelerometer, and the motion data received from the motion sensor can be, for example, three dimensional accelerometer data.

Further, the wearable apparatus 110 can exchange (send or receive) data from a remote data source. For example, an identity profile of a user, which can be used to uniquely identify the user, can be sent to a remote cloud server where the measurements can be stored for later retrieval and use.

Though illustrated as a single device, the wearable apparatus 110 can be part of a wearable system 100 which can multiple devices including a device such as the device core (not shown), which can be used to exchange data with the wearable apparatus 110, or with a remote computing device such as a server device (not shown) that can store the signals, including the motion data. The wearable apparatus 110 can be a single piece wearable device, or it can include several detachable components. For example, the wearable apparatus 110 can include a chest patch or a wristband, which can be attached to the chest or wrist of the individual. A device core which can be attached and removed from the chest patch or wristband. The chest patch can be, for example, an adhesive patch, a sticker, or the like. Further, when the wearable apparatus 110 is activated, the wearable apparatus 110 can, for example, monitor activities (such as eating or sleep), count steps, or determine heart related measurements such as heart rates or heart rate variability (HRV).

Figure 2:
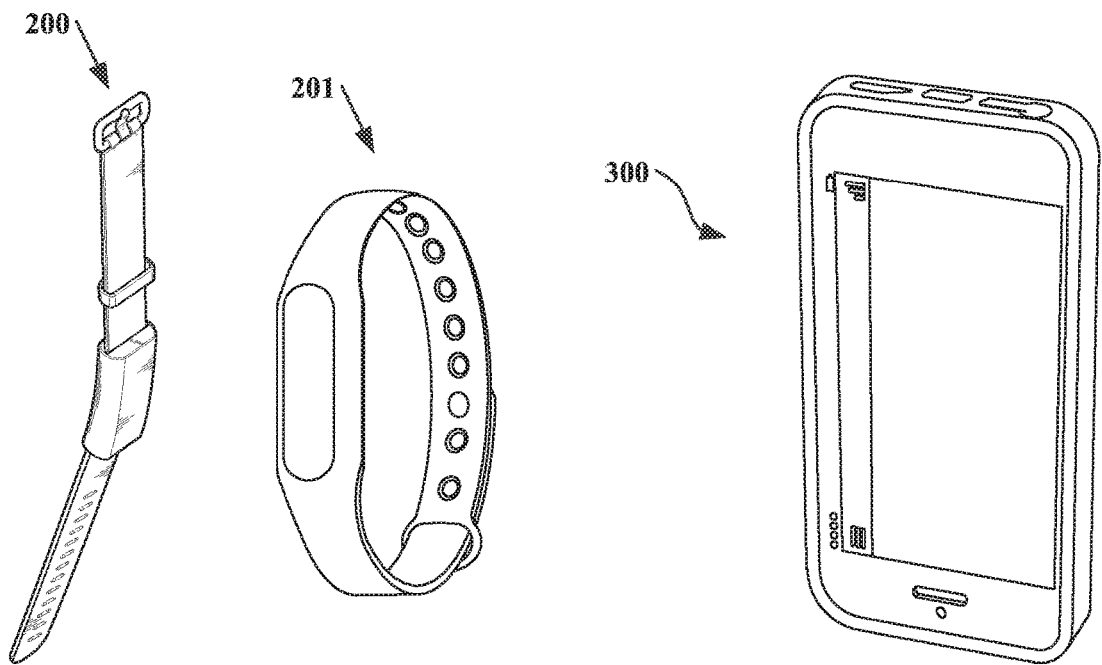
FIG. 2 is a diagram of an implementation of an example wearable device usable within implementations of the disclosure.
Figure 2:
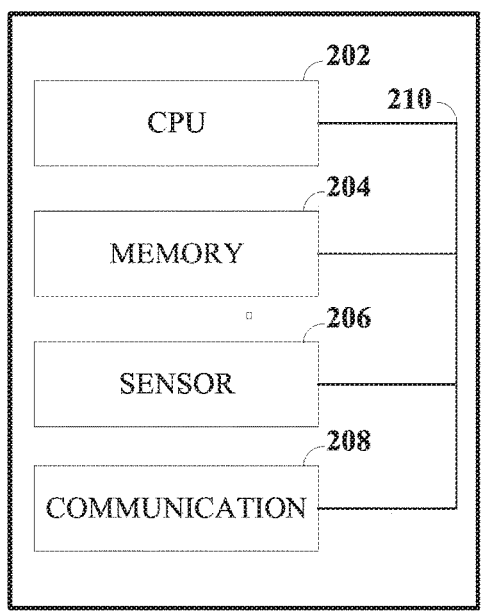

FIG. 2 is a diagram of an implementation of a wearable device usable within implementations of the disclosure. The wearable device can be the wearable system 100 discussed above with respect to FIG. 1. For example, the wearable device can include a device core and one or more accessory components as housing, such as a band or a chest patch (not shown). The wearable device can be a one-piece wearable device where the device core is integrated with the band, such as wearable device 200 as shown in FIG. 2. The device core can also be removably attached to the band, such as wearable device 200 as shown in FIG. 2.

In an implementation, the wearable device 200 or 201 comprises one or more of CPU 202, memory 204, sensor 206, communications component 208, or other components. One example of CPU 202 is a conventional central processing unit. CPU 202 may include single or multiple processors each having single or multiple processing cores. Alternatively, CPU 202 may include another type of device, or multiple devices, capable of manipulating or processing information now-existing or hereafter developed. Although implementations of wearable device 200 can be practiced with a single CPU as shown, advantages in speed and efficiency may be achieved using more than one CPU.

Memory 204 can comprise random access memory device (RAM) or any other suitable type of storage device. Memory 204 may include executable instructions and data for immediate access by CPU 202, such as data generated and/or processed in connection with sensors 206. Memory 204 may include one or more DRAM modules such as DDR SDRAM. Alternatively, memory 204 may include another type of device, or multiple devices, capable of storing data for processing by CPU 202 now-existing or hereafter developed. CPU 202 may access and manipulate data in memory 204 via a bus 210.

Sensors 206 can be one or more sensors disposed within or otherwise coupled to wearable device 200, for example, for identifying, detecting, determining, or otherwise generating signal data indicative of measurements associated with wearable device 200. In an implementation, sensors 206 can comprise one or more electromyography sensors, accelerometers, cameras, light emitters, touch sensors, or the like. The motion sensors can be three-axis (e.g., accelerometer), six-axis (e.g., accelerometer and gyroscope), nine-axis (e.g., accelerometer, gyroscope and magnetometer) or any other suitable sensor combinations. The cameras can be RGB cameras, infrared cameras, monochromatic infrared cameras, or any other suitable cameras. The light emitters can be infrared light emitting diodes (LED), infrared lasers, or any other suitable lights. Sensors 206 can comprise one or more sensors that can generate heart activity signals such as an electroencephalogram (EEG) sensor, a PPG sensor, an electromyogram (EMG) sensor, or the like. Sensors that can be included in the wearable device 200 can also include sensors capable of generating biometric signals, such as ECG signals, through non-invasive techniques such as without contacting the skin of the individual.

Sensors 206 can also comprise one or more bioimpedance sensors, microphones, temperature sensors, touch screens, finger readers, iris scanners, a combination of the above, or the like. Implementations of sensors 206 can include a single sensor, such as one of the foregoing sensors, or any combination of the foregoing sensors. In an implementation, the signal data can be identified, detected, determined, or otherwise generated based on any single sensor or combination of sensors included in wearable device 200.

Communications component 208 can be a hardware or software component configured to communicate data (e.g., measurements, etc.) from sensors 206 to one or more external devices, such as another wearable device or a computing device, for example. In an implementation, communications component 208 comprises an active communication interface, for example, a modem, transceiver, transmitter-receiver, or the like. In an implementation, communications component 208 comprises a passive communication interface, for example, a quick response (QR) code, Bluetooth identifier, radio-frequency identification (RFID) tag, a near-field communication (NFC) tag, or the like. Communication component 208 can operate over wired or wireless communication connections, such as, for example, a wireless network connection, a Bluetooth connection, an infrared connection, an NFC connection, a cellular network connection, a radio frequency connection, or any combination thereof. In some implementations, communication component 208 can use sound signals as input and output, such as, for example, an ultrasonic signal or a sound signal via an audio jack. Implementations of communications component 208 can include a single component, one of each of the foregoing types of components, or any combination of the foregoing components.

Wearable device 200 can also include other components not shown in FIG. 2. For example, wearable device 200 can include one or more input/output devices, such as a display. In an implementation, the display can be coupled to CPU 202 via bus 210. In an implementation, other output devices may be included in addition to or as an alternative to the display. When the output device is or includes a display, the display may be implemented in various ways, including by a LCD, CRT, LED, OLED, etc. In an implementation, the display can be a touch screen display configured to receive touch-based input, for example, in manipulating data output to the display.

Figure 3:
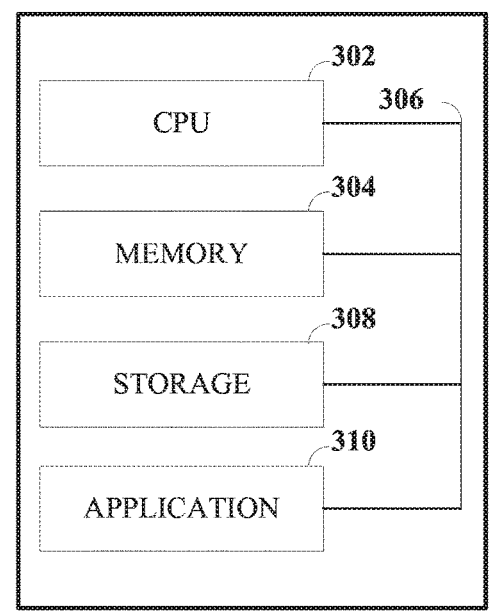
FIG. 3 is a diagram of an implementation of a computing device usable within implementations of the disclosure.

FIG. 3 shows a computing device as an example and a block diagram of a hardware configuration of computing device 300 according to implementations of this disclosure. Computing device 300 can be a part of the system for determining the wearing position of wearable device 200 disclosed herein. In some implementations, computing device 300 and wearable device 200 (or any device having measurement capabilities) can be the same device. Computing device 300 can be shown as an example type of computer in FIG. 3, but it is not limited to any specific type or any specific quantity in the system disclosed herein. Computing device 300 can be implemented by any configuration of one or more computers, such as a microcomputer, a mainframe computer, a super computer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, e.g., a smart watch, or a computing service provided by a computing service provider, e.g., a website, or a cloud service provider. In some implementations, computing device 300 can be a smart phone device that can be used to display and analyze signals such as motion data. In some implementations, certain operations described herein can be performed by a computer (e.g., a server computer) in the form of multiple groups of computers that are at different geographic locations and can or cannot communicate with one another by way of, such as, a network. While certain operations can be shared by multiple computers, in some implementations, different computers can be assigned with different operations.

Computing device 300 can include at least one processor such as CPU 302. CPU 302 as well as CPU 202 can be any type of device, or multiple devices, capable of manipulating or processing information. Although the examples herein can be practiced with a single processor as shown, advantages in speed and efficiency can be achieved using more than one processor. CPU 302 can be distributed across multiple machines or devices (each machine or device having one or more of processors) that can be coupled directly or across a local area or other network. Although the examples herein can be practiced with a single processor as shown, advantages in speed and efficiency can be achieved using more than one processor.

Memory 304 as well as memory 204 can be, for example, a random access memory device (RAM), a read-only memory device (ROM), an optical disc, a magnetic disc, or any other suitable type of storage device, and can store code and data that can be accessed by CPU 302 using a bus 306. Although a single bus 306 is depicted, multiple buses can be utilized. Memory 304 can be distributed across multiple machines or devices such as network-based memory or memory in multiple machines performing operations that can be described herein as being performed using a single computing device for ease of explanation. The code can include an operating system and one or more application program 310 processing and/or outputting the data. As will be discussed in detail below, application program 310 can include software components in the form of computer executable program instructions that cause CPU 302 to perform some or all of the operations and methods described herein. In some implementations, hardware configuration is used to implement computing device 300 or at least an analysis component of computing device 300, in which application program 310 stored by memory 304 can implement some or all of the processes as described in more detail below.

Computing device 300 can optionally include a storage device 308 in the form of any suitable non-transitory computer readable medium, such as a hard disc drive, a memory device, a flash drive or an optical drive. Storage device 308, when present, can provide additional memory when high processing requirements exist. Storage device 308 can also store any form of data, relating or not relating to cardiac information. Further, storage device can be a component of computing device 300 or can be a shared device that is accessed via a network.

Computing device 300 can include more devices or components. For example, computing device can further include one or more input devices, output devices, communication devices, or any other device that can be used to transmit, store, process, and present data.

Although FIG. 3 depicts one hardware configuration that can implement computing device 300, other configurations can be utilized. The hardware configuration of a computing system as depicted in an example in FIG. 3 thus can be implemented in a wide variety of configurations.

Figure 4:
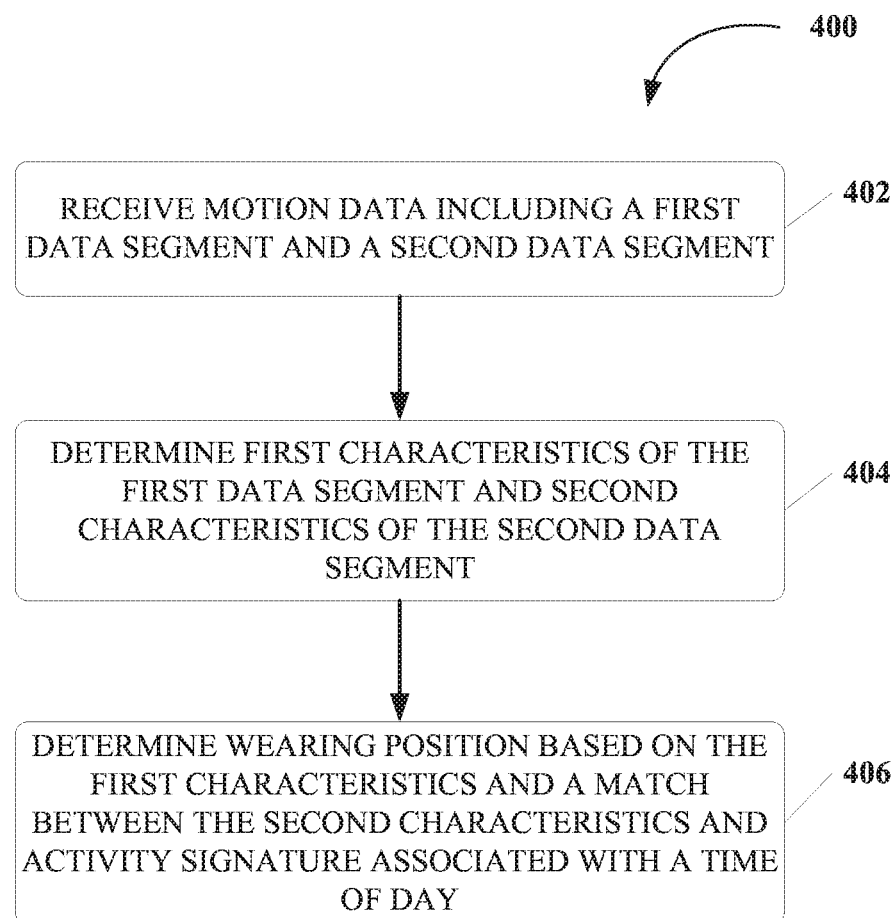
FIG. 4 is a diagram showing an implementation of a process for determining a wearing position of a wearable device.

FIG. 4 is a diagram showing an example process 400 of determining a wearing position of a wearable device according to implementations of this disclosure. In some implementations, some or all of the process 400 can be implemented in a device or apparatus including at least one of: the wearable apparatus 110, shown in FIG. 1, the wearable device 200 or 201 shown in FIG. 2, and the computing device 300 shown in FIG. 3. Implementations of process 400 can be performed entirely on the wearable device (e.g., wearable device 200 or 201) on which the sensor data is collected or generated, or on another wearable device and/or a computing device (e.g., computing device 300) in communication with one or more wearable devices. For example, the sensor data processing aspects of process 400 can be performed by instructions executable on the computing device. In some implementations, portions of process 400 can be performed by instructions executable on the computing device and/or one or more other devices, such as wearable device 200 or 201. In some implementations, the computing device 300 can be a cell phone, which can receive and display signals. The computing device 300 can also be a wearable device, such as a smart watch. In some implementations, the computing device 300 can be a cloud server. In some implementations, the wearable device 200 or 201 and the computing device 300 can be the same device.

The wearing position determined for the wearable device 200 or 201 can include, for example, an indication of whether the wearable device is being worn on the left or right side of the individual, an indication of whether the wearable device is being worn on a dominant or non-dominant side of the individual, an indication of whether the individual is left or right handed, and so on. The wearing position can also include any combination of the above. As discussed above, the wearing position of the wearable device 200 or 201 can be used for tuning different functionalities for the wearable device, such as, for example, providing different device settings according to the wearing position (e.g., whether the device is being worn on the dominant side). For example, when the wearable device 200 or 201 is on a different hand, parameters for gesture recognition applications, such as wrist raising or wrist rotation, can be adjusted accordingly, without human input. When the wearable device is on the dominant hand, for example, more sensing modules (or functions) can be activated on the wearable device. The wearing position can also be used to help the wearable device 200 or 201 to obtain more accurate results for activity tracking.

As described above, the wearable device 200 or 201, such as a fitness band or a smart watch, can be coupled to a motion sensor that can generate motion data. The motion sensor can be one or more devices or modules that can measure spatial and/or temporal parameters of the motion (e.g., velocity, speed, or acceleration). For example, the motion sensor can be an accelerometer, a gyroscope, a magnetometer, or an inertia measurement unit (IMU) sensor. The motion sensor can have one or more measurement axes (e.g., 3, 6, 9 or any other number), for measuring dimensions or directions. The motion data can include measurement data from the motion sensor indicating a motion status of the individual. For example, the motion sensor from which the motion is collected can be a motion sensor capable of measuring acceleration in three spatial dimensions (e.g., x-, y-, and z-direction), such as a 3-axis accelerometer (see FIG. 6 as an example).

At operation 402, motion data from a wearable device associated with an individual is received. In various examples, the motion data can be generated by a wearable device (e.g., the wearable device 200). The motion data can also be generated by another device and received by the wearable device. The motion data can also be generated by the wearable device or another device, and received by a computing device (e.g., the computing device 300).

The "receiving" used herein can refer to receiving, inputting, acquiring, retrieving, obtaining, reading, accessing, determining, or in any manner inputting data. As used herein, information, signals, or data are received by transmission or accessing the information, signals, or data in any form, such as receiving by transmission over a network, receiving by accessing from a storage device, or receiving by individual operation of an input device.

The motion data can be received, for example, in data segments. Data segments can be received as, for example, a continuous stream of accelerometer data. A data segment can be of any size. For example, a data segment can include data collected during twenty seconds or one minute. A data segment can bear a time stamp indicating the time period associated with the data segment.

The motion data can include a first data segment and a second data segment. For example, the first data segment can include one or more data segments associated with walking. The first data segment can also include data segments associated with running, bicycling, swimming or other types of activities that can be performed using both hands. The second data segment can include one or more data segments associated with non-walking. The data segments can be received at different times (such as when "streaming"), or at the same time (such as when "synching" after disconnecting for some time). Activities that are associated with dominant hands can be identified from the non-walking data segments. As for the walking segments (or running segments, or any data segments associated with activities that are usually performed with both hands), it can be difficult to detect activities associated with dominant hands, since the primary motion is walking or running. Instead, the walking segments can be used for detecting whether the wearable device is on the left or right hand.

In some implementations, the first data segments can be associated with a first type of activities, and the second data segments can be associated with a second type of activities. The types of data segments can be determined based on the characteristics (e.g., temporal or spatial characteristics) of the motion data within the data segments. For example, the types of data segments can be determined based on whether the activities are performed using, for example, dominant hands.

The motion data can be generated by a motion sensor in the wearable device, which can be used to determine motion characteristics of the wearable device, such as linear or angular motion characteristic. For example, the motion characteristics can include velocity, acceleration, speed, direction, or inertia. In some implementations, the motion sensor can be an accelerometer, a gyroscope, a magnetometer, an Inertial Measurement Unit (IMU), or any combination of any sensor for detecting motion characteristics of the wearable device. When the individual is wearing the wearable device on a body part (e.g., wrist or chest), the motion signal can be used to indicate the motion characteristics of that body part of the individual. In some implementations, the motion data can be generated as a data stream. For example, when a wearable device having a 3-axis accelerometer is worn by an individual, the 3-axis accelerometer can generate a stream of accelerometer data when the individual is performing an activity such as walking.

At operation 404, characteristic data associated with the first data segment(s) ("first characteristic data") and characteristic data associated with the second data segment(s) ("second characteristic data") is determined. Operation 404 can be performed by the wearable device, or on an accompanying application running on the computing device (such as a smart phone).

The first characteristics data can include features extracted from the first data segment(s), which are used to detect whether the wearable device is being worn on the left or right hand of the individual. In some implementations, the first characteristic data can include features indicative of axial movement of the wearable device.

The second characteristics data can include features extracted from the second data segment(s), which are used to determine whether a match to one of the activity signatures exists. For example, when the second data segment(s) is a non-walking data segment, it is possible that an activity signature can be matched to the second characteristic data of the second data segment(s). The second characteristic data can be extracted from the non-walking data segments based on various patterns or features of the motion data, such as, for example, geometry, frequency, amplitude, statistics, periodicity, temporality, longevity, or any other pattern or feature that can be used to identify or distinguish an activity.

At operation 406, a wearing position of the wearable device associated with the individual is determined based on the first characteristic data and a match between the second characteristic data and an activity signature associated with a time of day.

The wearing position of the wearable device can be determined based on the received signals, for example, the motion data received at operation 402. In some implementations, the position can be determined based on the motion data and some other data, such as an ECG signal. For example, to determine the position of wearable device 200 or 201, the motion signal data (e.g., accelerometer data) can be input to rule-based or statistical models, which can be generated by offline training based on labeled data (e.g., data associated with known wearing positions). By analyzing the motion characteristics of wearable device 200 or 201 upon receiving the motion data, the position of wearable device 200 or 201 can be determined automatically.

In some implementations, determining the wearing position of the wearable device can be implemented using a two-stage process, e.g., to detect whether the individual is left-handed or right-handed. At a first stage, the first data segment(s), such as walking data segments, are identified from the motion data, and features extracted from these segments, such as the first characteristic data at operation 404, are used to detect whether the wearable device is being worn on the left or right hand of the individual. The features extracted can include, for example, characteristic data. At a second stage, the second data segment(s), such as non-walking data segments, are identified from the motion data, from which daily activity signatures (also referred to as "activity signatures"), usually performed using dominant hands, are identified. For example, if at least one of such activities is detected, the wearable device can be determined to be on a dominant side. Otherwise, the wearable device can be determined to be on a non-dominant side. Based on the results from the first stage and the second stage, the individual can be determined as left-handed or right-handed, for example.

In some implementations, the wearing position include an indication of whether the individual is left-handed or right-handed, which can be determined based on the indication of whether the wearable device is worn on a left or right side of the individual as well as the match between the second characteristic data and the activity signature associated with the time of day, as will be discussed below.

Figure 5:
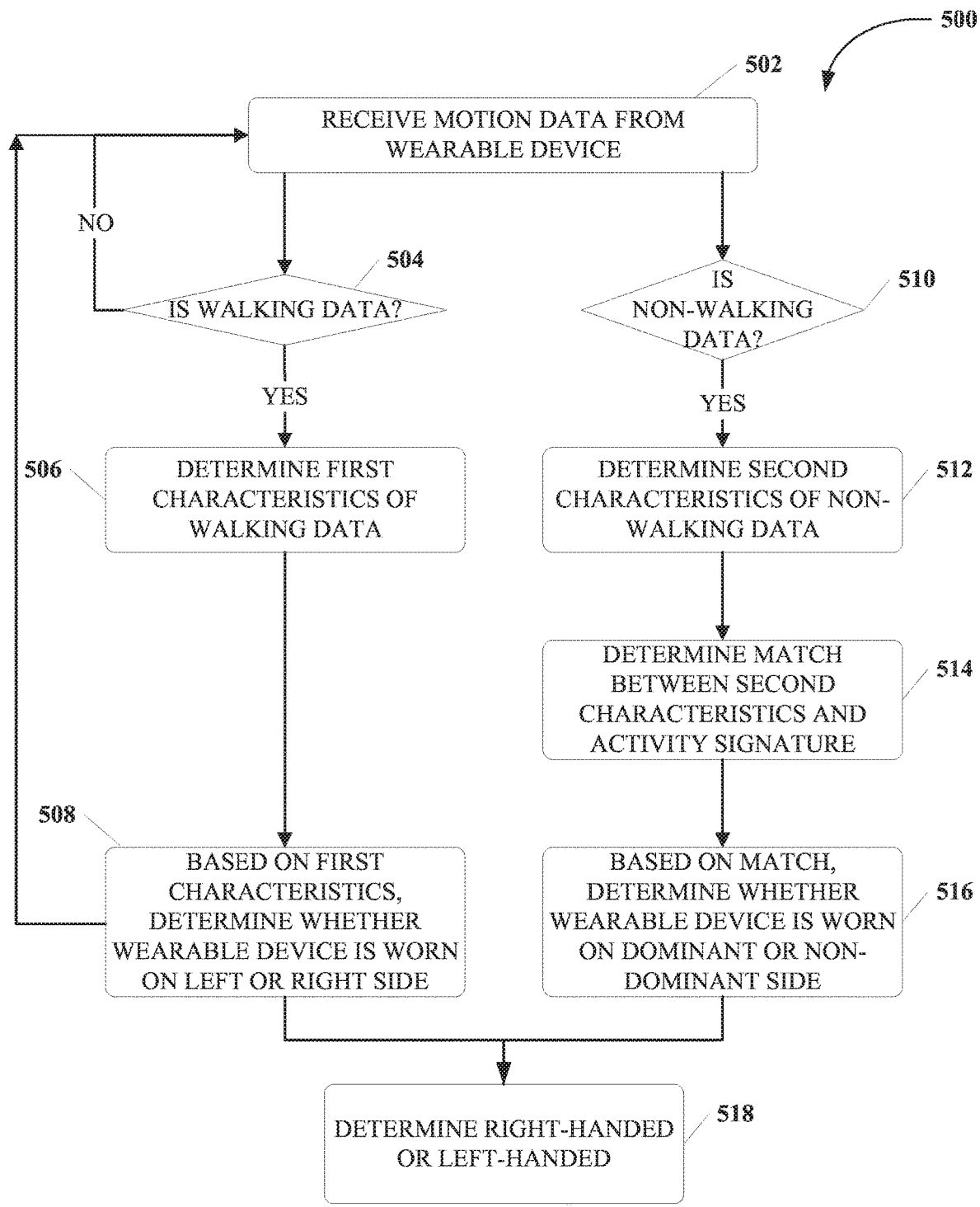
FIG. 5 is a diagram showing an implementation of a multi-stage process for determining wearing position(s) of the wearable device.

FIG. 5 is a diagram showing an example of a multi-stage process 500 for determining wearing position(s) of a wearable device. In some implementations, some or all of the process 500 can be implemented as part of process 400. In some implementations, some or all of the process 500 can be implemented in a device or apparatus including at least one of: the wearable apparatus 110, shown in FIG. 1, the wearable device 200 or 201 shown in FIG. 2, and the computing device 300 shown in FIG. 3.

At operation 502, motion data is received from the wearable device. Similar to operation 402, the motion data received can be associated with an individual wearing the wearable device, such as the wearable device 200 or 201. Similar to operation 402, the motion data can include, for example, accelerometer data. As described above, the motion data can be collected by the motion sensor, which can be, for example, an accelerometer. The motion data can be accelerometer data measured from the accelerometer. The motion data can include, for example, raw data received from the wearable device, or processed data such as aggregated or annotated data.

At operation 504, it is determined whether the motion data comprises a walking data segment. Similar to operation 404, the motion data can be processed in data segments. The walking data segment can include the first data segment described above in process 400. The walking data segments can be identified using activity recognition techniques, such as step detection techniques. For example, a step counter can be used for step detection. A walking data segment can be identified using a property associated with the data segment such as step count. In one example, the data segment is identified as walking data segments when the step count for a data segment is at or above a certain threshold. Otherwise, the data segment is identified as non-walking data segment. The threshold can be predefined or learned from user behavior. Other step detection techniques can be used. If it is determined that the motion data comprises a walking data segment, process 500 proceeds to operation 506. Otherwise, process 500 proceeds to operation 502 to receive the next data segment.

At operation 506, first characteristics data associated with the walking data segment is determined. For example, first characteristics data can include features extracted from the walking data segment, which are used to detect whether the wearable device is being worn on the left or right hand of the individual. In some implementations, the first characteristic data can include features indicative of axial movement of the wearable device. For example, determining the first characteristics data can include determining the accelerometer values along an axis that exhibits different behaviors (such as having opposite signs) from the left to the right hand for a given device model. For different devices, the axis may be different, depending on the orientation of the accelerometer inside the device.

At operation 508, an indication of whether the wearable device is being worn on the left or right hand of the individual is determined based on the first characteristics data. In some implementations, a wearing position can include an indication of whether the wearable device is worn on a left or right side of the individual. Based on characteristics of the accelerometer data, it can be determined which side (e.g., finger, hand, wrist, arm, leg, or ankle) of the individual the wearable device is worn on. For example, the axis that exhibits different behaviors (such as having opposite signs of values) from the left to the right hand can be used to determine the wearing position, because the acceleration values along that axis (referred to herein as "the axis of hand") correlate with whether the wearable device is on the left or right hand.

Figure 6:
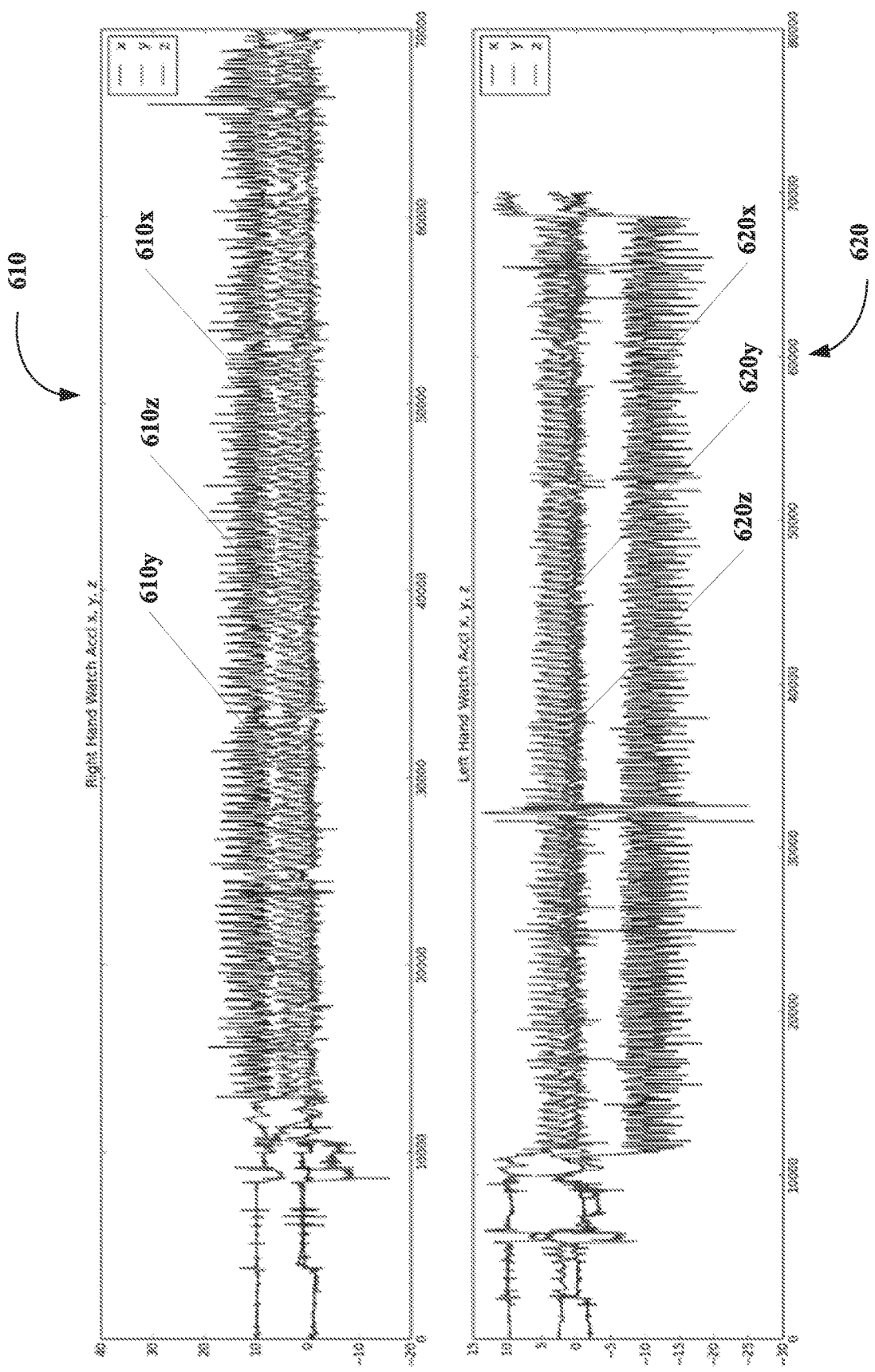
FIG. 6 is an example diagram of motion data collected by a wearable device worn on different hands of an individual.

FIG. 6 shows example diagrams of motion data plots 610 and 620 collected by a wearable device (e.g., watch) worn on different hands of an individual. Motion data plot 610 shows motion data collected by the wearable device worn on a right hand. Motion data plot 620 shows motion data collected by the wearable device worn on a left hand. The motion data is shown as 3-axis accelerometer data having x, y, and z-axis values. For example, to determine whether the individual is walking, the 3-axis accelerometer can generate raw accelerometer data along three axes, based on which one or more step detection techniques can be used to determine whether the individual is walking. In some implementations, the raw accelerometer data can be processed to extract a step count, which is compared with a predetermined threshold. Depending on whether the step count is at or above, or falls below the predetermined threshold, segments of the accelerometer data can be determined as walking data segments and non-walking data segments, respectively. The walking data segments of the motion data can be represented by the motion data plots 610 or 620 in FIG. 6, where the horizontal axes represent a timeline, and the vertical axes represent values of accelerometer in x-, y-, and z-direction generated by the 3-axis accelerometer. As shown in the motion data plots 610 and 620, the accelerometer data in at least one of x-, y-, and z-axis can have different features of movement, depending on whether the wearable device is worn on the right or left hand of the individual.

In some implementations, the motion sensor is associated with a spatial configuration with respect to the wearable device. In those implementations, it can be assumed that spatial configurations of motion sensors with respect to wearable devices are identical for a same model produced by a same manufacturer. When the motion sensor is moving, whether the wearable device is worn on the left side or right side of the individual can be determined based on characteristics of the motion data generated by the moving motion sensor. The movement of the motion sensor can be caused by movement of a body portion of the individual where the wearable device is worn. For example, if the wearable device is a wristband or a wristwatch, the movement of the motion sensor can be caused by the individual moving hands when walking, jogging, or running.

When the individual is walking, one or more arms can be in a circular acceleration. For example, in some implementations, the z-axis (e.g., a longitudinal axis along the arm where the wearable device is worn) can have similar values regardless of being worn on the right or left hand. Based on the spatial configuration of the 3-axis accelerometer with respect to the wearable device, which can be specific to a particular device, either the x- or y-axis can be an axis of the hand, which can be indicative of axial movement. In some implementations, the acceleration along the x-axis ("x-acceleration") can be quite different (e.g., represented by opposite signs of values) for different hands, while the acceleration along the y-axis ("y-acceleration," e.g., perpendicular to both x- and z-acceleration) can have similar values. In some other implementations, the acceleration along the y-axis can be different and represented by opposite signs of values while on different hands. The axis of hand can be used to identify whether the device is worn on the left hand or the right hand, because the acceleration along the axis of hand can be in opposite direction when the device is on the left hand compared to the right hand.

For example, as shown in FIG. 6, x-acceleration values 610x of the motion data plot 610 are generally greater than or equal to zero (thus having positive signs), while x-acceleration values 620x of the motion data plot 620 are generally less than or equal to zero (thus having negative signs). The z-acceleration values of the motion data plots 610 and 620, respectively 610z and 620z, are similar to each other. The y-acceleration values of the motion data plots 610 and 620, respectively 610y and 620y, are generally near zero. Depending on the way the wearable device is worn on the walking individual's wrist, the x-acceleration values can be, for example, generally greater than or equal to zero when the wearable device is worn on the right hand as shown in 610x, and generally less than or equal to zero when worn on the left hand as shown in 620x. Therefore, in this example, the x-axis can be used as the axis of hand to determine whether the wearable devices of the same model are worn on a left or right hand.

In some implementations, the first characteristic data can be compared with orientation data associated with the wearable device to determine which side the wearable device is worn on. The orientation data can be predetermined based on the device model or type. The orientation data can include parameters of, for example, the spatial configuration of the motion sensor with respect to the wearable device, the ways in which the wearable device is worn on body sides of the individual, or any other data relating to orientation information of the motion sensor or the wearable device. In some implementations, the orientation data can have predetermined values or ranges of values of the first characteristic data, which can be specific to the model of the wearable device. Once the model of the wearable device is identified, the accelerometer orientation can be assumed to be identical, and the values along the axis of hand should have similar signs or patterns for all devices of that particular model when they are worn on the same hand (left or right) for all users.

In some implementations, whether the wearable device is worn on the left or right side of the individual can be determined based on the first characteristic data by a computing device. The computing device can be, for example, a first computing device (e.g., a cellphone or smartphone) coupled to the wearable device with a wired or wireless connection. The computing device can also be, for example, one or more second computing devices (e.g., remote server computers or a computing cloud) connected to the wearable device or the first computing device via a network connection.

In some implementations, the orientation data associated with a model of the wearable device can be stored locally in the wearable device (e.g., in a memory coupled to the wearable device) or remotely in the computing device (e.g., in a cellphone or a remote server). Optionally, the orientation data can be generated based on motion data generated from one or more sources (e.g., multiple individuals and/or multiple measurements from a same individual). For example, the motion data generated from one or more sources can be aggregated and/or combined. The orientation data can be generated using, for example, a statistical method or a machine learning method. For example, if the wearable device having the 3-axis accelerometer is worn by the individual and connected to a smartphone, when the individual is walking, the wearable device can identify the axes for the 3-axis accelerometer, and send the accelerometer data to the smartphone. The smartphone can processed the accelerometer data to identify on which side of the individual the wearable device is worn, or further send the accelerometer data to another computing device (e.g., a server computer or a cloud) which can perform the identification process and return the processing results to the individual.

Back to FIG. 5, at operation 510, it is determined whether the motion data comprises a non-walking data segment. The non-walking data segment can include the second data segment described above in process 400. Similar to operation 504, the non-walking data segment can be identified using the step detection techniques. For example, a non-walking data segment can be identified using a property associated with the data segment such as step count. In one example, the data segment is identified as non-walking data segments when the step count for a data segment falls below a certain threshold. Other step detection techniques can be used.

At operation 512, second characteristics data associated with the non-walking data segment is determined. For example, the second characteristics data can include features extracted from the non-walking data segment, which are used to determine whether a match to one of the activity signatures exists.

The second characteristic data can be extracted from the non-walking data segments based on various patterns or features of the motion data, such as, for example, geometry, frequency, amplitude, statistics, periodicity, temporality, longevity, or any other pattern or feature that can be used to identify or distinguish an activity. Various methods can be used to determine the activity signatures for the daily activities, such as, for example, a learning based method, a statistics based method, or any other suitable method. In some implementations, the activity signatures can include temporal characteristics of the motion data learned from daily activities. For example, the activity signatures can be learned using an unsupervised machine learning method based on temporal characteristics of the motion data. The activity signature can include learned patterns based on variations of the motion data measured from the activity associated with the activity signature. The activity signature can be determined by, for example, identifying similar patterns in the accelerometer data in a cloud sever, which can collect data from hundreds to millions of users of the wearable device.

If the wearable device is on the dominant hand, there can be specific types of variations in the accelerometer readings from that device. Many of these activities also take place on similar times of the day. Therefore, on specific times of the day those specific variations in the accelerometer data can be searched for from the device.

At operation 514, a match between the second characteristics data and an activity signature associated with a time of day is determined. For example, the second characteristic data can be extracted from the non-walking data segments measured in a time of day and compared with the activity signature associated with the time of day. If there is a match between the second characteristic data and the activity signature for the same time of day, the activity associated with the activity signature can be identified.

In some implementations, the activity signatures can be identified based on motion data received from one or more sources (e.g., multiple individuals and/or multiple measurements from a same individual). For example, the motion data can be received from daily activities performed by multiple individuals, upon which further learning, analysis, aggregation or storage can be performed. For example, non-walking data segments can be clustered according to second characteristics, or time of day, or both. Activity signature associated with the time of day can be determined based on, for example, temporal characteristics, and patterns of the motion data aggregated or clustered.

Figure 7:
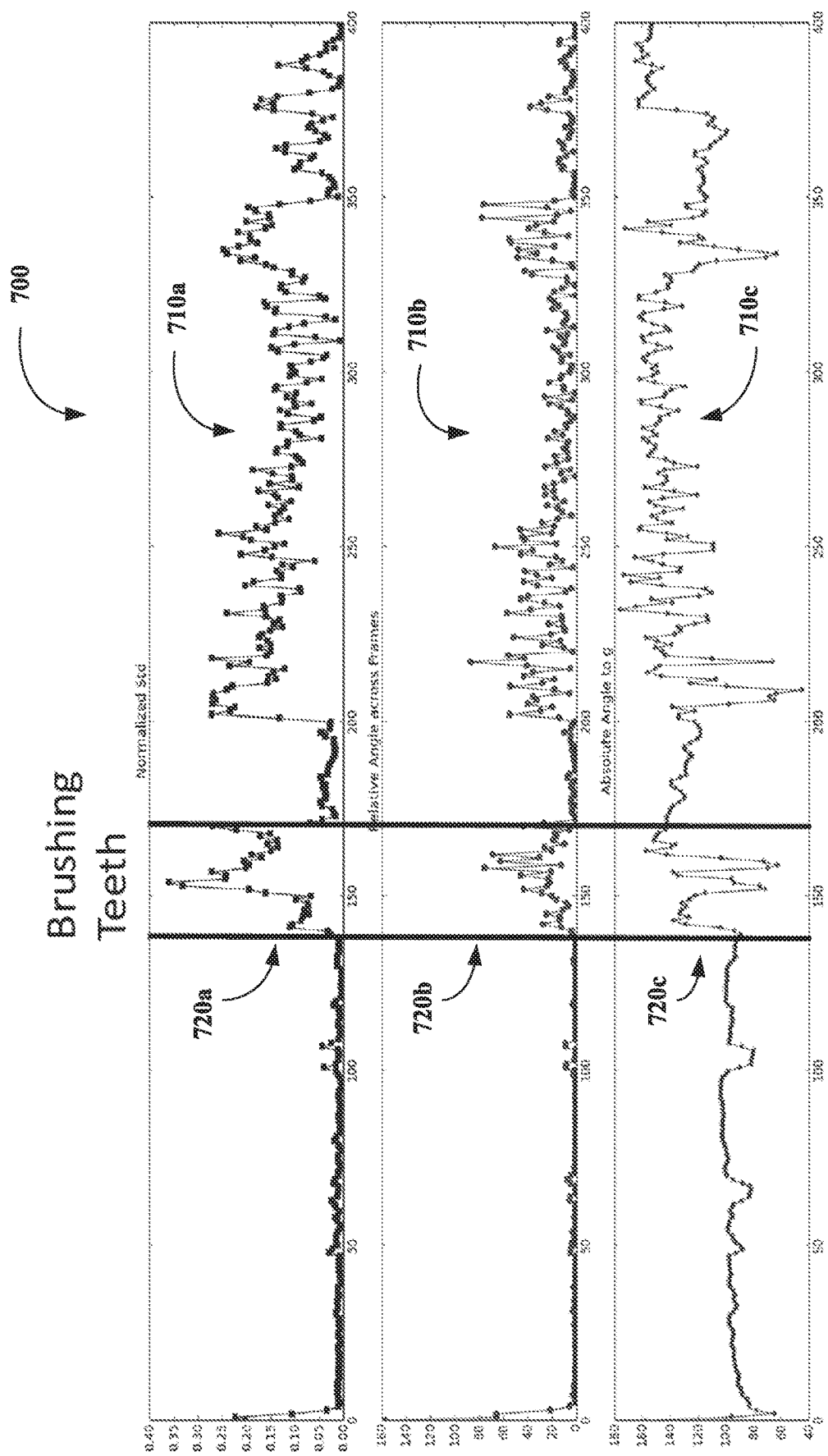
FIG. 7 is an example diagram of an activity identified from motion data that can be used as an activity signature.

FIG. 7 shows an example diagram 700 indicative of an example activity identified from motion data generated by a wearable device. In this example, the wearable device 200 or 201 is worn on a dominant side of an individual. The diagram 700 shows motion data collected from a dominant hand in the morning period. By plotting different features across the timeline, the activity signature from brushing teeth is shown to be significantly different from those from other time periods.

Considering that daily activities often take place on similar time periods of a day, an activity signature associated with a specific activity (e.g., brushing teeth or eating) can be identified and associated with a corresponding time of the day (e.g., in the morning or at night). The activity signature (e.g., brushing teeth in FIG. 7) can be associated with a dominant side of the individual, for example. For example, the activity signature can be associated with a time of day when the activity is frequently performed using a dominant side of a human body. In some implementations, the time of day can include one or more time periods associated with a day.

The motion data can include non-walking data segments including accelerometer data measured from an accelerometer. The diagram 700 includes three data plots 710a-710c. In the data plots 710a-710c, the vertical axes represent the respective values being calculated, and the horizontal axes represent a timeline. Data plot 710a shows values of normalized standard deviation of acceleration. Data plot 710b shows values of relative angles of acceleration across frames. Data plot 710c shows values of absolute angles of acceleration with respect to gravitational acceleration g.

In the data plots 710a-710c, the morning time period of "brushing teeth" is shown on the timeline as between the two bold vertical lines. Various patterns are shown for this activity, such as the normalized standard deviation of acceleration represented in pattern 720a, the relative angles of acceleration across frames represented in pattern 720b, and the absolute angles of acceleration with respect to g represented in pattern 720c. The patterns 720a-720c associated with the activity of "brushing teeth" are different from features of the motion data collected during the other time periods. The second characteristic data can be extracted from the patterns 720a-720c and compared with an activity signature associated with brushing teeth at similar time of day. If there is a match, it can be determined that the hand where the wearable device is worn is performing the activity of brushing teeth.

Back to FIG. 5, at operation 516, an indication of whether the wearable device is on the dominant or non-dominant side of the individual based on the match is determined at operation 514. For example, daily activities usually performed using dominant sides can be recognized from collected motion data. In some implementations, if multiple of such activities are detected in the motion data for the individual, it can be inferred that the wearable device is worn on the dominant side (e.g., hand) of the user. Otherwise, if such activities are absent in an entire day, it can be determined with sufficient confidence that the wearable device is worn on the non-dominant side of the user.

A wearing position can include an indication of whether the wearable device is worn on a dominant or non-dominant side of the individual. Since people do certain daily activities (e.g., brushing teeth, eating, cleaning, etc.) with their dominant hands, it can be inferred whether the individual is wearing the wearable device on the dominant side based on characteristics of the motion data.

In some implementations, the wearable device or the computing device can determine, at operation 518, a wearing position indicating whether the individual is left-handed or right-handed based on the indication of whether the wearable device is worn on a left or right side of the individual and the match between the second characteristic data and the activity signature associated with the time of day. For example, if the wearable device is determined as worn on the right hand and a non-dominant side, it can be inferred that the individual is left-handed. For another example, if the wearable device is determined as worn on the right hand and a dominant side it can be inferred that the individual is right-handed.

In some implementations, operations 512 and 514 can be combined into one operation, in which the activity signature is identified from the non-walking data directly without determining the second characteristic data.

Figure 8:
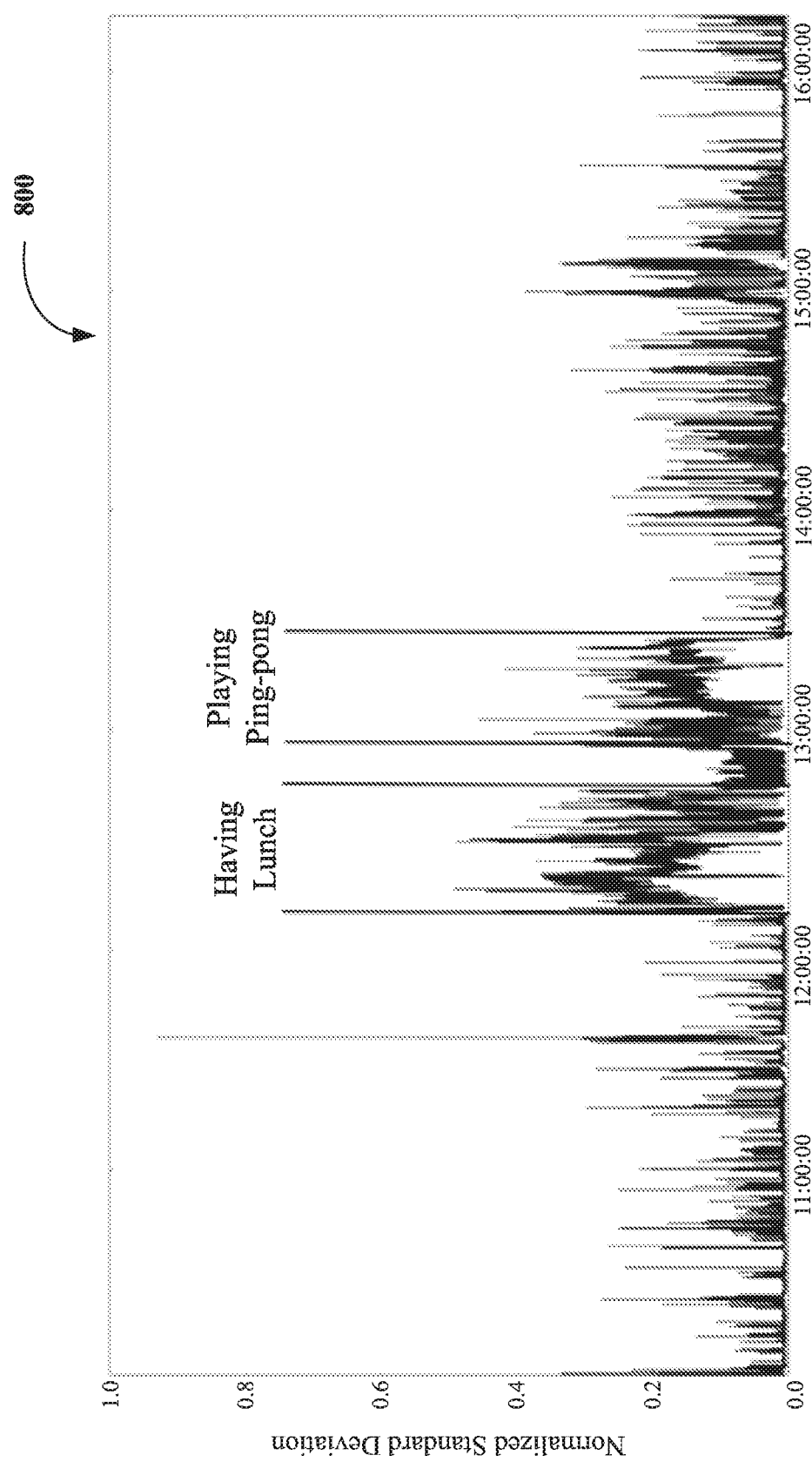
FIG. 8 is an example diagram of activities identified from motion data during different time periods of a day.

FIG. 8 shows an example timeline 800 including example activities identified from motion data during different time periods of a day. The motion sensor that can be used for measuring the motion data can be, for example, an accelerometer. The motion data shown in the timeline 800 can include accelerometer data measured from the accelerometer. The vertical axis of the timeline 800 represents example values of normalized standard deviation of acceleration. The timeline can be generated for a day, a week, a month, a system or a user defined time period, etc.

For example, in FIG. 8, using a similar process for activity identification as described above, the individual wearing the wearable device can be identified as performing a different activity (e.g., having lunch) during a time period indicated on the timeline between 12:15 and 12:45. The individual is also identified as performing another activity (e.g., playing ping-pong) during another time period indicated on the timeline between 13:00 and 13:30. Based on the identified activities (having lunch and playing ping-pong), it can be determined that the wearable device is worn on the dominant hand of the individual.

While the current disclosure has been described in connection with certain embodiments or implementations, it is to be understood that the invention is not to be limited to the disclosed embodiments or implementations, but, on the contrary, is intended to cover various modifications and equivalent arrangements included within the scope of the appended claims, which scope is to be accorded the broadest interpretation so as to encompass all such modifications and equivalent structures as is permitted under the law.

The aspects herein can be described in terms of functional block components and various processing operations. Such functional blocks can be realized by any number of hardware and/or software components that perform the specified functions. For example, the described aspects can employ various integrated circuit components, e.g., memory elements, processing elements, logic elements, look-up tables, and the like, which can carry out a variety of functions under the control of one or more microprocessors or other control devices.

Similarly, where the elements of the described aspects are implemented using software programming or software elements the disclosure can be implemented with any programming or scripting language such as C, C++, Java, assembler, or the like, with the various algorithms being implemented with any combination of data structures, objects, processes, routines or other programming elements. Functional aspects can be implemented in algorithms that execute on one or more processors. Furthermore, the aspects of the disclosure could employ any number of techniques for electronics configuration, signal processing and/or control, data processing and the like. The words "mechanism" and "element" are used broadly and are not limited to mechanical or physical embodiments or aspects, and can include software routines in conjunction with processors and other electronic computing devices.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the disclosure can be implemented using machine readable instructions in the form of code for operation of any or any combination of the aforementioned computational hardware. Computational code can be implemented in the form of one or more modules by which individual or combined functions can be performed as a computational tool, the input and output data of each module being passed to/from one or more further module during operation of the methods and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

While the disclosure has been described in connection with certain embodiments and implementations, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

As used in this disclosure, an initial element described by a word or phrase, followed by the phrase "includes at least one of" and one or more additional elements described by one or more words or phrases (which can also include the term "and") can be construed to mean that the initial element includes any combination of the one or more additional elements. For example, the statement "X includes at least one of A and B" can mean: the initial element X can include the additional element A; the initial element X can include the additional element B; or that the initial element X can include both of the additional element A and the additional element B.

What is claimed is:

1. A method for determining a wearing position of a wearable device, comprising:
   receiving motion data from the wearable device associated with an individual, wherein the motion data comprises a first data segment associated with a first activity performed using both hands of the individual and a second data segment associated with a second activity, the second activity being associated with a dominant hand of the individual,
   wherein the first data segment is indicative of first activities performed with both a dominant side and a non-dominant side of the individual at a same time, and
   wherein the second data segment is indicative of second activities performed using only the dominant side of the individual;
   determining first characteristic data associated with the first data segment and second characteristic data associated with the second data segment; and
   determining, by a computing device, the wearing position of the wearable device associated with the individual based on the first characteristic data and a match between the second characteristic data and an activity signature associated with a time of day, wherein the wearing position indicates at least one of
   whether the individual is wearing the wearable device on the dominant side or the non-dominant side of the individual,
   whether the individual is wearing the wearable device on a left or a right side of the individual, or
   whether the individual is left-handed or right-handed.

2. The method of claim 1, wherein determining, by the computing device, the wearing position of the wearable device associated with the individual based on the first characteristic data and the match between the second characteristic data and the activity signature associated with the time of day comprises:
   determining whether the wearable device is worn on the dominant side or the non-dominant side of the individual based on the match between the second characteristic data and the activity signature associated with the time of day.

3. The method of claim 1, wherein the first activity is walking, the second activity is non-walking, the first data segment is indicated by a step count at or above a predetermined threshold, and the second data segment is indicated by the step count falling below the predetermined threshold.

4. The method of claim 1, further comprising:
   determining, by the computing device, an indication of whether the wearable device is worn on the left or the right side of the individual based on the first characteristic data.

5. The method of claim 1, wherein the first characteristic data associated with the first data segment comprises feature data indicative of axial movement of the wearable device.

6. The method of claim 1, wherein the wearable device comprises a motion sensor comprising at least one of: an accelerometer, a gyroscope, an inertia measurement unit (IMU) sensor, and a magnetometer; and wherein the motion data comprises measurement data from the motion sensor.

7. The method of claim 1, wherein the activity signature is associated with an activity frequently performed using the dominant side of a human body during the time of day, and the time of day comprises one or more time periods associated with a day.

8. The method of claim 1, wherein the activity signature comprises temporal characteristics of the motion data learned from daily activities performed by multiple individuals.

9. The method of claim 1, wherein the computing device and the wearable device are a same device.

10. The method of claim 4, wherein determining, by the computing device, the indication of whether the wearable device is worn on the left or the right side of the individual based on the first characteristic data further comprises:
    comparing the first characteristic data with predetermined orientation data associated with the wearable device.

11. The method of claim 4, wherein determining, by the computing device, the wearing position of the wearable device associated with the individual based on the first characteristic data and the match between the second characteristic data and the activity signature associated with the time of day comprises:
    determining whether the individual is left-handed or right-handed based on the indication of whether the wearable device is worn on the left or the right side of the individual and the match between the second characteristic data and the activity signature associated with the time of day.

12. A method for determining a wearing position of a wearable device, comprising:
    receiving motion data from the wearable device associated with an individual, wherein the motion data comprises a first data segment and a second data segment, the first data segment associated with walking, and the second data segment associated with non-walking,
    wherein the first data segment associated with walking are indicative of first activities performed with both a dominant hand and a non-dominant hand of the individual at a same time, and wherein the second data segment associated with non-walking are indicative of second activities performed using only the dominant hand of the individual;

determining first characteristic data associated with the first data segment and second characteristic data associated with the second data segment; and determining, by a computing device, the wearing position of the wearable device associated with the individual based on the first characteristic data and a match between the second characteristic data and an activity signature associated with a time of day.

13. The method of claim 12, wherein the wearing position indicates at least one of whether the individual is wearing the wearable device on the dominant hand or the non-dominant hand of the individual, whether the individual is wearing the wearable device on a left or a right side of the individual, or whether the individual is left-handed or right-handed.

14. A method for determining a wearing position of a wearable device, comprising:

receiving motion data from the wearable device associated with an individual, wherein the motion data comprises a first data segment and a second data segment, wherein the first data segment being associated with a first activity performed using a dominant side and a non-dominant side of the individual at a same time, wherein the second data segment being associated with a second activity, the second activity being associated with a dominant hand of the individual, and performed using both hands of the individual, and wherein the second data segment are indicative of second activities performed using only the dominant side of the individual;

determining first characteristic data associated with the first data segment and second characteristic data associated with the second data segment; and determining, by a computing device, the wearing position of the wearable device associated with the individual based on the first characteristic data and a match between the second characteristic data and an activity signature associated with a time of day, wherein the wearing position indicates whether the individual is left-handed or right-handed.

15. The method of claim 14, wherein determining, by the computing device, the wearing position of the wearable device associated with the individual based on the first characteristic data and the match between the second characteristic data and the activity signature associated with the time of day comprises:

determining whether the wearable device is worn on the dominant side or the non-dominant side of the individual based on the match between the second characteristic data and the activity signature associated with the time of day.

16. The method of claim 14, wherein the first data segment is indicated by a step count at or above a predetermined threshold, and the second data segment is indicated by the step count falling below the predetermined threshold.

17. The method of claim 14, further comprising:

determining, by the computing device, an indication of whether the wearable device is worn on the left or the right side of the individual based on the first characteristic data.

18. The method of claim 14, wherein the activity signature is associated with an activity frequently performed using the dominant side of a human body during the time of day, and the time of day comprises one or more time periods associated with a day.

19. The method of claim 14, wherein the activity signature comprises temporal characteristics of the motion data learned from daily activities performed by multiple individuals.

20. The method of claim 17, wherein determining, by the computing device, the wearing position of the wearable device associated with the individual based on the first characteristic data and the match between the second characteristic data and the activity signature associated with the time of day comprises:

determining whether the individual is left-handed or right-handed based on the indication of whether the wearable device is worn on the left or the right side of the individual and the match between the second characteristic data and the activity signature associated with the time of day.

* * * * *